United States Patent
Zhu

(10) Patent No.: US 9,826,281 B2
(45) Date of Patent: *Nov. 21, 2017

(54) MEDIA PROCESSING METHOD, DEVICE, AND SYSTEM USING MEDIA RECEIVING CLIENTS

(71) Applicant: Huawei Device Co., Ltd., Shenzhen (CN)

(72) Inventor: Yu Zhu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,836

(22) PCT Filed: Dec. 19, 2014

(86) PCT No.: PCT/CN2014/094336
§ 371 (c)(1),
(2) Date: May 11, 2016

(87) PCT Pub. No.: WO2015/096664
PCT Pub. Date: Jul. 2, 2015

(65) Prior Publication Data
US 2016/0295296 A1    Oct. 6, 2016

(30) Foreign Application Priority Data
Dec. 25, 2013 (CN) .......................... 2013 1 0729245

(51) Int. Cl.
*H04N 21/643* (2011.01)
*H04N 21/41* (2011.01)
(Continued)

(52) U.S. Cl.
CPC ....... *H04N 21/643* (2013.01); *H04N 21/4126* (2013.01); *H04N 21/41407* (2013.01);
(Continued)

(58) Field of Classification Search
None
See application file for complete search history.

(56) References Cited

U.S. PATENT DOCUMENTS 8,948,202 B2 * 2/2015 Lee ..................... H04L 12/2838
370/467
2003/0126293 A1 * 7/2003 Bushey ............. G06F 17/30905
709/246
(Continued)

FOREIGN PATENT DOCUMENTS

CN   101304335 A   11/2008
CN   101304350 A   11/2008
(Continued)

OTHER PUBLICATIONS

Partial English Translation and Abstract of Japanese Patent Application No. JP2007255427, Nov. 8, 2016, 10 pages.
(Continued)

*Primary Examiner* — Hoang-Vu A Nguyen-Ba
(74) *Attorney, Agent, or Firm* — Conley Rose, P.C.

(57) ABSTRACT

A media processing method, device, and system where one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. Therefore multiple media playback devices may be connected flexibly and simultaneously and a media playback device may be switched as desired during media playback.

12 Claims, 7 Drawing Sheets

(51) Int. Cl.
H04N 21/414 (2011.01)
H04N 21/4363 (2011.01)
H04N 21/436 (2011.01)

(52) U.S. Cl.
CPC . *H04N 21/43615* (2013.01); *H04N 21/43635* (2013.01); *H04N 21/43637* (2013.01)

(56) References Cited

U.S. PATENT DOCUMENTS

| | | | |
|---|---|---|---|
| 2004/0246992 A1* | 12/2004 | Henry | H04L 12/2803 370/467 |
| 2007/0180485 A1 | 8/2007 | Dua | |
| 2008/0133717 A1 | 6/2008 | Bouchat et al. | |
| 2008/0282268 A1 | 11/2008 | Liekens et al. | |
| 2009/0019104 A1 | 1/2009 | Justen et al. | |
| 2009/0219820 A1 | 9/2009 | Acke et al. | |
| 2010/0057921 A1 | 3/2010 | Zhang et al. | |
| 2010/0132000 A1 | 5/2010 | Straub et al. | |
| 2010/0189064 A1* | 7/2010 | Raveendran | H04L 65/605 370/329 |
| 2011/0096728 A1 | 4/2011 | Wu et al. | |
| 2011/0113126 A1 | 5/2011 | Fang et al. | |
| 2011/0228770 A1* | 9/2011 | Dholakia | H04L 45/586 370/390 |
| 2012/0120184 A1 | 5/2012 | Fornell et al. | |
| 2012/0151006 A1 | 6/2012 | McInerney et al. | |
| 2012/0158984 A1 | 6/2012 | Maitre et al. | |
| 2012/0166660 A1 | 6/2012 | Zhang et al. | |
| 2012/0265862 A1 | 10/2012 | Fang et al. | |
| 2013/0268640 A1 | 10/2013 | Wu et al. | |

FOREIGN PATENT DOCUMENTS

| | | |
|---|---|---|
| CN | 101682743 A | 3/2010 |
| CN | 101795288 A | 8/2010 |
| CN | 101800917 A | 8/2010 |
| CN | 102130937 A | 7/2011 |
| CN | 102292957 A | 12/2011 |
| CN | 102572606 A | 7/2012 |
| JP | 2007255427 A | 10/2007 |
| JP | 2010114721 A | 5/2010 |
| JP | 2011244265 A | 12/2011 |
| JP | 2013514708 A | 4/2013 |
| WO | 02063879 A2 | 8/2002 |
| WO | 2010092019 A1 | 8/2010 |
| WO | 2011105770 A2 | 9/2011 |

OTHER PUBLICATIONS

"Series H: Audiovisual and Multimedia Systems, Infrastructure of audiovisual services—Coding of moving video, Advanced video coding for generic audiovisual services," ITU-T, H.264, Apr. 2013, 732 pages.

"Series H: Audiovisual and Multimedia Systems, Infrastructure of audiovisual services—Coding of moving video, High efficiency video coding," ITU-T, H.265, Apr. 2013, 317 pages.

"Part 11: Wireless LAN Medium Access Control (MAC) and Physical Layer (PHY) Specifications, Amendment 4: Enhancements for Very High Throughput for Operation in Bands below 6 GHz," IEEE Computer Society, IEEE Std 802.11ac, 2013, 425 pages.

"Part 11: Wireless LAN Medium Access Control (MAC) and Physical Layer (PHY) Specifications, Amendment 5: Enhancements for Higher Throughput," IEEE Computer Society, IEEE Std 802.11n, Oct. 29, 2009, 536 pages.

"Home Networking Protocol 2.0," OpenCable Specifications, Home Networking 2.0, OC-SP-HNP2.0-110-130530, May 30, 2013, 123 pages.

Foreign Communication From a Counterpart Application, European Application No. 14875194.4, Extended European Search Report dated Sep. 29, 2016, 7 pages.

Foreign Communication From a Counterpart Application, PCT Application No. PCT/CN2014/094336, English Translation of International Search Report dated Mar. 27, 2015, 3 pages.

Foreign Communication From a Counterpart Application, PCT Application No. PCT/CN2014/094336, English Translation of Written Opinion dated Mar. 27, 2015, 7 pages.

Partial English Translation and Abstract of Chinese Patent Application No. CN101800917, Aug. 11, 2010, 13 pages.

"Functional Requirements for Broadband Residential Gateway Devices," TR-124, Broadband Forum, Technical Report, Issue 1.0, Dec. 2006, 93 pages.

"Data Model for a TR-069 Enabled STB," TR-135, Broadband Forum, Technical Report, Issue 1, Dec. 2007, 114 pages.

"CPE WAN Management Protocol," TR-069 Amendment 3, Broadband Forum, Technical Report, Issue 2, Nov. 2010, 197 pages.

"Telecommunications and Internet converged Services and Protocols for Advanced Networking (TISPAN); Analysis of protocols for customer networks connected to TISPAN NGN,"ETSI TR 185 007, V2.0.0, Technical Report, March 2008, 24 pages.

Delphinanto, A., et al., "Remote Discovery and Management of End-User Devices in Heterogeneous Private Networks," IEEE Consumer Communications and Networking Conference, Jan. 10-13, 2009, 5 pages.

Office Action dated Feb. 27, 2015, 30 pages, U.S. Appl. No. 13/908,642, filed Jun. 3, 2013.

Foreign Communication From a Counterpart Application, European Application No. 11845348.9, Extended European Search Report dated Dec. 20, 2013, 7 pages.

Foreign Communication From a Counterpart Application, PCT Application No. PCT/CN2011/083284, English Translation of International Search Report dated Mar. 15, 2012, 2 pages.

Foreign Communication From a Counterpart Application, PCT Application No. PCT/CN2011/083284, English Translation of Written Opinion dated Mar. 15, 2012, 12 pages.

Machine Translation and Abstract of Japanese Publication No. JP2010114721, May 20, 2010, 21 pages.

Foreign Communication From a Counterpart Application, Chinese Application No. 201310729245.3, Chinese Office Action dated May 15, 2017, 7 pages.

\* cited by examiner

MEDIA PROCESSING METHOD, DEVICE, AND SYSTEM USING MEDIA RECEIVING CLIENTS

CROSS-REFERENCE TO RELATED APPLICATIONS

This application is a U.S. National Stage of International Application No. PCT/CN2014/094336, filed on Dec. 19, 2014, which claims priority to Chinese Patent Application No. 201310729245.3, filed on Dec. 25, 2013, both of which are hereby incorporated by reference in their entireties.

TECHNICAL FIELD

The present disclosure relates to the field of media processing technologies, and in particular, to a media processing method, device, and system.

BACKGROUND

With promotion of high-definition digital media content, including popularization of a high-definition/ultra high-definition video format (720 progressive scan (p), 1080p, 4 kilo (K), 8K), a three-dimensional (3D) high-quality/lossless audio format, and the like, an increasing number of new wired and wireless high-definition audio and video transmission technologies and interface standards emerge in the market. For example, wired technologies, such as High-Definition Multimedia Interface (HDMI), DISPLAYPORT, Digital Interactive Interface for Video and Audio (DIIVA), HDBASET, Mobile High-Definition Link (MHL), and THUNDERBOLT, and wireless technologies, such as Wireless Gigabit (WIGIG), Wireless Home Digital Interface (WHDI), WIRELESSHD, and Institute of Electrical and Electronics Engineers (IEEE) 802.11n/ac are applied to various types of digital home audio/video devices (such as a high-definition/3D television set, a digital versatile disc (DVD)/Blu-ray player, a high-definition set top box, a projector, and a high-fidelity (Hi-Fi) stereo).

As a mobile device (such as a mobile phone and a tablet computer) becomes universally intelligent, the mobile device has gradually involved in an ecological environment of home network audio and video. Technologies, such as the Universal Plug and Play (UPnP) protocol, the Digital Living Network Alliance (DLNA) protocol, the Intelligent Grouping and Resource Sharing (IGRS) protocol, AIRPLAY, MIRACAST (Wi-Fi display), and INTEL wireless display (WiDi), allow a mobile phone and a digital home audio/video device to share media data by means of Wi-Fi, or to share media data by means of BLUETOOTH. Though some digital home audio/video devices support technologies such as the MHL and the HDMI, cable plugging is not convenient enough for a user. Therefore, the user is more likely to interact with a digital home audio/video device by means of Wi-Fi or BLUETOOTH, and some adaptor devices appear in the market. A small Wi-Fi/BLUETOOTH to HDMI converter is a commonly used adaptor device. The converter receives audio and video content of a mobile phone by means of Wi-Fi, decodes the audio and video content, and outputs the audio and video content to a display device such as a television or a projector through the HDMI. In addition, some converters also support receiving, by means of BLUETOOTH, of a control signal from the mobile device and convert the control signal into an HDMI control signal, thereby implementing control of the display device, for example, program switching and volume adjustment.

However, there are some limitations on an adaptor device currently, which are mainly embodied as follows. There is only one HDMI interface, only one display device can be connected at a time, and if a user switches the display device, the user needs to remove an adaptor and insert the adaptor again.

SUMMARY

Embodiments of the present disclosure provide a media processing method, device, and system in order to implement that multiple media playback devices can be connected flexibly and simultaneously and that a media playback device can be switched as desired during media playback.

According to a first aspect, a media processing method is provided, including determining, by a media processing device, at least one first communications protocol, and acquiring a media processing capability and a supported second communications protocol of at least one media playback device, constructing, by the media processing device for each of the first communications protocol, at least one media receiving client that has the media processing capability of the at least one media playback device, and sending information about the at least one media receiving client to a media source device using a network interface corresponding to the first communications protocol, receiving, by the media processing device, to-be-played media data that is sent by the media source device and that is to be played by a media receiving client specified by the media source device, and sending, by the media processing device using a second communications protocol corresponding to the specified media receiving client, the to-be-played media data to a media playback device that is corresponding to the specified media receiving client, for the media playback device to play.

In a first possible implementation manner, acquiring a media processing capability and a supported second communications protocol of at least one media playback device further includes finding, by the media processing device, the at least one media playback device by connection to a communications interface of the at least one media playback device, and acquiring the media processing capability and the supported second communications protocol of the at least one media playback device.

With reference to the first aspect, in a second possible implementation manner, acquiring a media processing capability and a supported second communications protocol of at least one media playback device further includes reading, by the media processing device, a port information table of a local area network router that is connected to the media processing device, and acquiring, from the port information table of the local area network router, the media processing capability and the supported second communications protocol of the at least one media playback device that is connected to the router.

With reference to the first aspect, the first possible implementation manner of the first aspect, or the second possible implementation manner of the first aspect, in a third possible implementation manner, constructing, by the media processing device for each of the first communications protocol, at least one media receiving client that has the media processing capability of the at least one media playback device further includes constructing, by the media processing device with respect to each of the first communications protocol, a media receiving client that has a media processing capability of each media playback device.

With reference to the first aspect, the first possible implementation manner of the first aspect, or the second possible implementation manner of the first aspect, in a fourth possible implementation manner, constructing, by the media processing device for each of the first communications protocol, at least one media receiving client that has the media processing capability of the at least one media playback device includes combining, by the media processing device, the media processing capability of the at least one media playback device into at least one type of media processing capability, and constructing, by the media processing device with respect to each of the first communications protocol, a media client that has each type of combined media processing capability.

With reference to the first aspect, the first possible implementation manner of the first aspect, or the second possible implementation manner of the first aspect, in a fifth possible implementation manner, constructing, by the media processing device for each of the first communications protocol, at least one media receiving client that has the media processing capability of the at least one media playback device includes determining, by the media processing device, a media receiving client corresponding to the at least one first communications protocol supported by the at least one media playback device, constructing, by the media processing device with respect to each of the first communications protocol that is not supported by the at least one media playback device, at least one media receiving client that has the media processing capability of the at least one media playback device, and/or constructing, by the media processing device with respect to each of the first communications protocol that is supported by the at least one media playback device, at least one media receiving client that has a media processing capability that is not supported by the media playback device but is supported by the media processing device.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, receiving, by the media processing device, to-be-played media data that is sent by the media source device and that is to be played by a media receiving client specified by the media source device includes receiving, by the media processing device, a network address that is of the to-be-played media data and that is sent by the media source device, and acquiring, by the media processing device, the to-be-played media data according to the network address.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, after receiving, by the media processing device, to-be-played media data that is sent by the media source device and that is to be played by a media receiving client specified by the media source device, and before sending, by the media processing device using a second communications protocol corresponding to the specified media receiving client, the to-be-played media data to a media playback device that is corresponding to the specified media receiving client, for the media playback device to play, the method further includes unpacking and/or decoding, by the media processing device, the received to-be-played media data according to a first communications protocol corresponding to the specified media receiving client, and encoding and/or packing, by the media processing device according to the second communications protocol corresponding to the specified media receiving client, the to-be-played media data that is unpacked and/or decoded.

With reference to the fourth possible implementation manner of the first aspect, in an eighth possible implementation manner, the sending, by the media processing device using a second communications protocol corresponding to the specified media receiving client, the to-be-played media data to a media playback device that is corresponding to the specified media receiving client, for the media playback device to play further includes synchronously sending, by the media processing device using a second communications protocol separately corresponding to the specified media receiving client that has a combined media processing capability, audio and/or video of the to-be-played media data separately to at least two media playback devices that are corresponding to the specified media receiving client, for the media playback devices to play.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, the first communications protocol includes any one of the BLUETOOTH protocol, the UPnP protocol, the DLNA protocol, the IGRS protocol, the AIRPLAY protocol, and the Wi-Fi display protocol, and the second communications protocol includes any one of the HDMI protocol, the DISPLAYPORT protocol, the DIIVA protocol, the HDBASET protocol, the MHL protocol, the THUNDERBOLT protocol, the WIGIG protocol, the WHDI protocol, and the WIRELESSHD protocol.

According to a second aspect, a media processing device is provided, including a determining unit configured to determine at least one first communications protocol, a first acquiring unit configured to acquire a media processing capability and a supported second communications protocol of at least one media playback device, a first constructing unit configured to construct, for each of the first communications protocol, at least one media receiving client that has the media processing capability of the at least one media playback device, a first sending unit configured to send information about the at least one media receiving client to a media source device using a network interface corresponding to the first communications protocol, a first receiving unit configured to receive to-be-played media data that is sent by the media source device and that is to be played by a media receiving client specified by the media source device, and a second sending unit configured to send, using a second communications protocol corresponding to the specified media receiving client, the to-be-played media data to a media playback device that is corresponding to the specified media receiving client, for the media playback device to play.

In a first possible implementation manner, the first acquiring unit includes a finding unit configured to find the at least one media playback device by connection to a communications interface of the at least one media playback device, and a second acquiring unit configured to acquire the media processing capability and the supported second communications protocol of the at least one media playback device.

With reference to the second aspect, in a second possible implementation manner, the first acquiring unit is further configured to read a port information table of a local area network router that is connected to the media processing device, and acquire, from the port information table of the local area network router, the media processing capability and the supported second communications protocol of the at least one media playback device that is connected to the router.

With reference to the second aspect, the first possible implementation manner of the second aspect, or the second possible implementation manner of the second aspect, in a third possible implementation manner, the first constructing unit is further configured to construct, with respect to each of the first communications protocol, a media receiving client that has a media processing capability of each media playback device.

With reference to the second aspect, the first possible implementation manner of the second aspect, or the second possible implementation manner of the second aspect, in a fourth possible implementation manner, the first constructing unit includes a combining unit configured to combine the media processing capability of the at least one media playback device into at least one type of media processing capability, and a second constructing unit configured to construct, with respect to each of the first communications protocol, a media client that has each type of combined media processing capability.

With reference to the second aspect, the first possible implementation manner of the second aspect, or the second possible implementation manner of the second aspect, in a fifth possible implementation manner, the first constructing unit includes a determining unit configured to determine a media receiving client corresponding to the at least one first communications protocol supported by the at least one media playback device, a third constructing unit configured to construct, with respect to each of the first communications protocol that is not supported by the at least one media playback device, at least one media receiving client that has the media processing capability of the at least one media playback device, and/or a fourth constructing unit configured to construct, with respect to each of the first communications protocol that is supported by the at least one media playback device, at least one media receiving client that has a media processing capability that is not supported by the media playback device but is supported by the media processing device.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, the first receiving unit includes a second receiving unit configured to receive a network address that is of the to-be-played media data and that is sent by the media source device, and a third acquiring unit configured to acquire the to-be-played media data according to the network address.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner, the device further includes an unpacking and decoding unit configured to unpack and/or decode the received to-be-played media data according to a first communications protocol corresponding to the specified media receiving client, and an encoding and packing unit configured to encode and/or pack, according to the second communications protocol corresponding to the specified media receiving client, the to-be-played media data that is unpacked and/or decoded.

With reference to the fourth possible implementation manner of the second aspect, in an eighth possible implementation manner, the second sending unit is further configured to synchronously send, using a second communications protocol separately corresponding to the specified media receiving client that has a combined media processing capability, audio and/or video of the to-be-played media data separately to at least two media playback devices that are corresponding to the specified media receiving client, for the media playback devices to play.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner, the first communications protocol includes any one of the BLUETOOTH protocol, the UPnP protocol, the DLNA protocol, the IGRS protocol, the AIRPLAY protocol, and the Wi-Fi display protocol, and the second communications protocol includes any one of the HDMI protocol, the DISPLAYPORT protocol, the DIIVA protocol, the HDBASET protocol, the MHL protocol, the THUNDERBOLT protocol, the WIGIG protocol, the WHDI protocol, and the WIRELESSHD protocol.

According to a third aspect, a media processing system is provided, including a media source device, the media processing device according to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, or the ninth possible implementation manner of the second aspect, and at least one media playback device, where the media source device is connected to the media processing device, and the media processing device is directly connected to the at least one media playback device or is connected to the at least one media playback device using a local area network router.

According to the technical solutions of the media processing method, device, and system provided in the embodiments of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
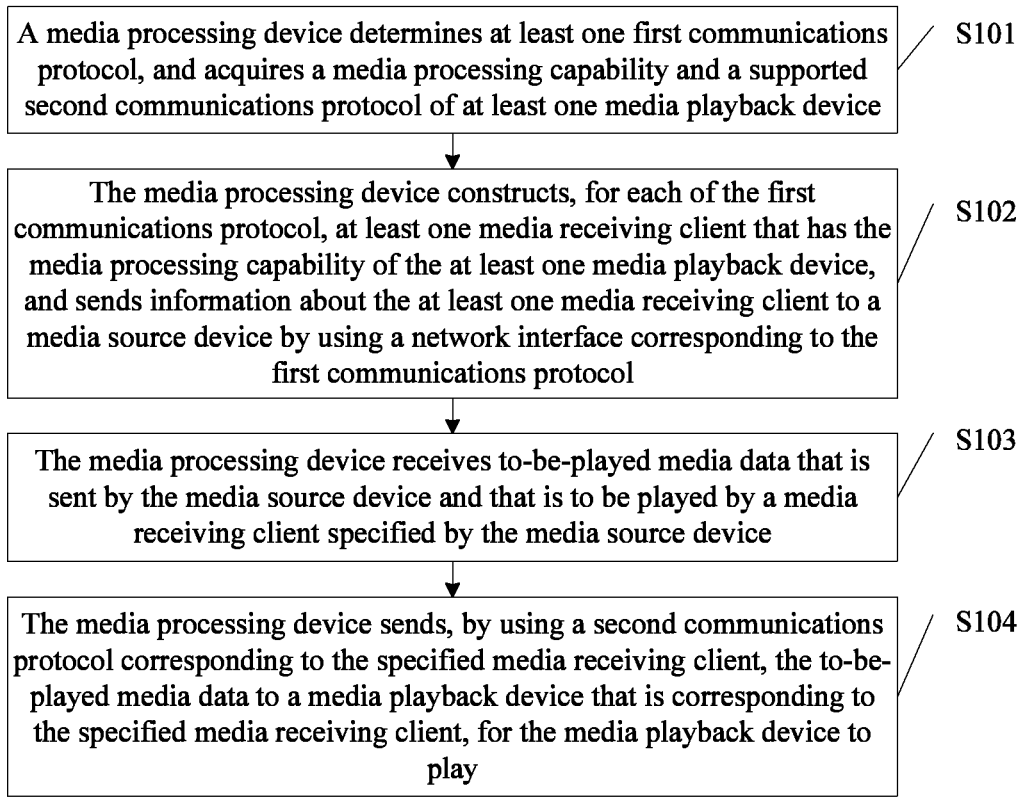
FIG. 1 is a schematic flowchart of a media processing method according to an embodiment of the present disclosure.

Refer to FIG. 1, which is a schematic flowchart of a media processing method according to an embodiment of the present disclosure. The method includes the following steps.

Step S101: A media processing device determines at least one first communications protocol, and acquires a media processing capability and a supported second communications protocol of at least one media playback device.

In this embodiment of the present disclosure, the media processing device communicates with a media source device, and sends, to a media playback device, to-be-played media data that is acquired from the media source device or that is acquired using the media source device. In this step, the media processing device determines one or more first communications protocols, where the first communications protocol is a communications protocol used between the media processing device and the media source device. The media processing device communicates with one or more media playback devices to acquire a media processing capability and a supported second communications protocol of the one or more media playback devices, where a communications protocol used between the media processing device and the one or more media playback devices is the second communications protocol. The media processing capability is a playback capability of the media playback device, which may be any one or more of a supported media format (for example, H.264, H.265, Moving Picture Experts Group (MPEG)-1 or MPEG-2 Audio Layer III (MP3), and Joint Photographic Experts Group (JPEG)), a supported media type (for example, video, audio, audio and video, and an image), a supported video resolution (for example, 720p, 1080p, 4K, and 8K), a supported pixel depth (for example, 30 bits per pixel, 36 bits per pixel, and 48 bits per pixel), a supported video frame rate (for example, 24 hertz (Hz), 50 Hz, and 60 Hz), whether 3D are supported, a supported audio sampling rate (for example, 32 kilohertz (kHz), 44.1 kHz, and 48 kHz), and the like.

The first communications protocol includes any one of the BLUETOOTH protocol, the Universal Plug and Play protocol, the Digital Living Network Alliance protocol, the Intelligent Grouping and Resource Sharing protocol, the AIRPLAY protocol (a wireless communications technology developed by Apple Inc.), and the Wi-Fi display protocol.

The media playback device may be a computer, a television set, a player, or the like. The second communications protocol includes any one of the HDMI protocol, the DISPLAYPORT protocol, the DIIVA protocol, the HDBASET protocol, the MHL protocol, the THUNDERBOLT protocol, the WIGIG protocol, the WHDI protocol, and the WIRELESSHD protocol.

Step S102: The media processing device constructs, for each of the first communications protocol, at least one media receiving client that has the media processing capability of the at least one media playback device, and sends information about the at least one media receiving client to a media source device using a network interface corresponding to the first communications protocol.

The media processing device constructs one or more media receiving clients with respect to each of the first communications protocol, where the media receiving client has the media processing capability of the foregoing one or more media playback devices. Then, the media processing device sends, to the media source device using a network interface corresponding to each of the first communications protocol, information about a constructed media receiving client corresponding to the first communications protocol, where the information about the media receiving client includes a name and/or an icon, a media processing capability, and the like of the media receiving client.

The media source device may be a terminal device such as a mobile phone or a tablet computer.

Step S103: The media processing device receives to-be-played media data that is sent by the media source device and that is to be played by a media receiving client specified by the media source device.

After the media source device acquires the information about the media receiving client, the name and/or the icon of the media receiving client is displayed on the media source device. Matching the to-be-played media data with the media processing capability of the media receiving client may be performed in order to determine a media receiving client that plays the to-be-played media data. Certainly, playback herein is not playback actually performed by the media receiving client, but playback performed by a media playback device that has an actual media processing capability and that is corresponding to the media receiving client, or may be operated by a user on the media source device to specify a media receiving client. The to-be-played media data may be media data that can be directly played, or an address of media data that can be played may be acquired. The media source device sends the to-be-played media data and specified information of the media receiving client to the media processing device.

The media processing device receives the to-be-played media data and the specified information of the media receiving client.

Step S104: The media processing device sends, using a second communications protocol corresponding to the specified media receiving client, the to-be-played media data to a media playback device that is corresponding to the specified media receiving client, for the media playback device to play.

Because the constructed media receiving client is corresponding to one or more media playback devices, and each media playback device communicates with the media processing device using the second communications protocol, where the second communications protocol may be one communications protocol or multiple communications protocols, the media processing device sends, using the second communications protocol, the received to-be-played media data to the media playback device that is corresponding to the specified media receiving client, for the media playback device to play.

In this embodiment, multiple media playback devices are connected to a media processing device. A media source device may be corresponding to multiple media receiving clients. Each media receiving client has a corresponding media processing capability. The media source device only needs to specify a media receiving client for playback according to matching between to-be-played media data and a media processing capability of a media receiving client or according to an operation instruction of a user, and after receiving the to-be-played media data, the media processing device may send the to-be-played media data to a media playback device corresponding to the specified media receiving client. Because the media source device is corresponding to a virtually constructed media receiving client, the media receiving client may be switched as desired such that the media playback device that actually performs playback is switched.

It can be seen that according to the media processing method provided in this embodiment of the present disclosure, one or more media receiving clients that have a media processing capability of one or more media playback devices are separately constructed for multiple communications protocols. To-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 2:
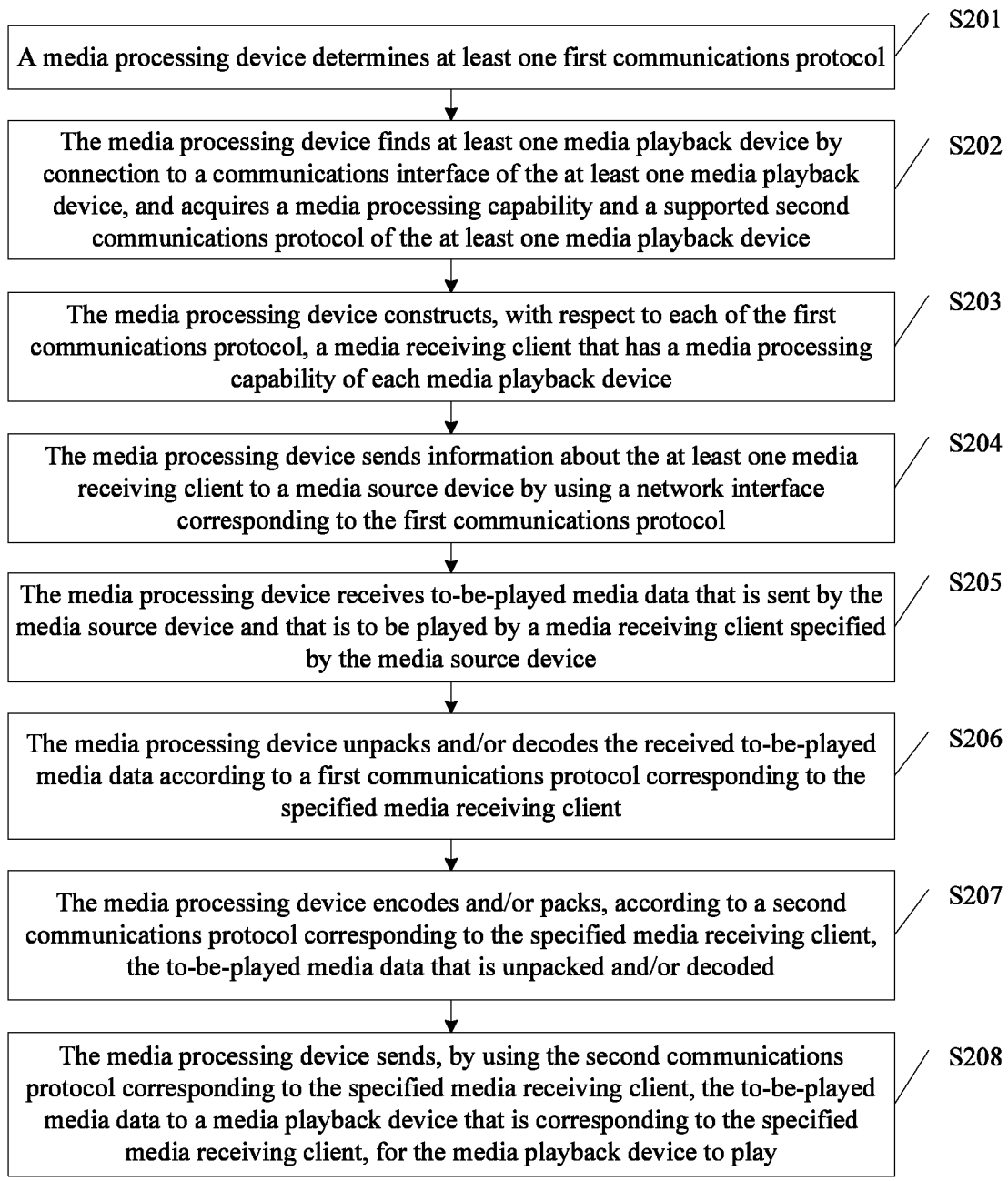
FIG. 2 is a schematic flowchart of another media processing method according to an embodiment of the present disclosure.

Refer to FIG. 2, which is a schematic flowchart of another media processing method according to an embodiment of the present disclosure. The method includes the following steps.

Step S201: A media processing device determines at least one first communications protocol.

Figure 3:
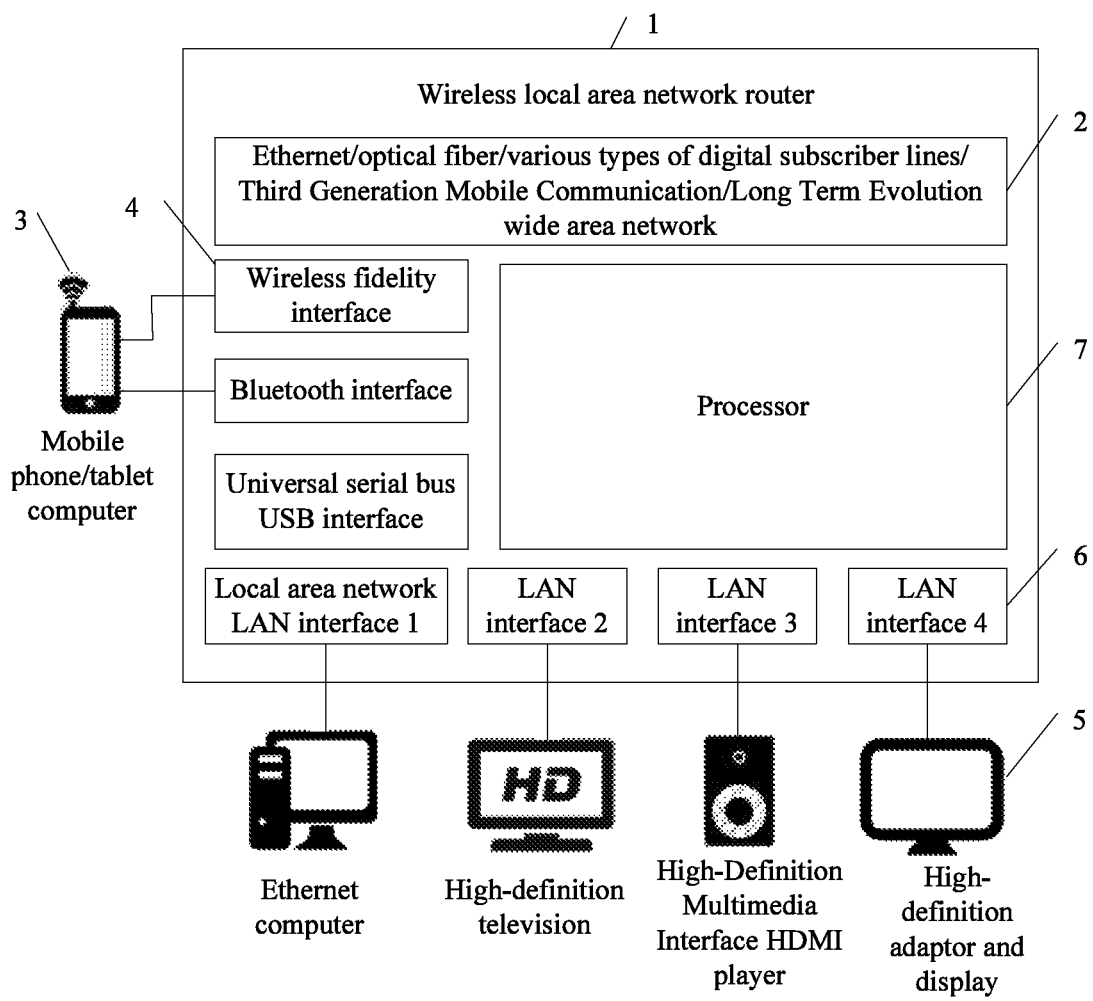
FIG. 3 is a schematic diagram of a structure of an illustrated media processing device.

This step is the same as step S101 in the foregoing embodiment. In this embodiment, the media processing device may be a local area network router. As shown in FIG. 3, which is a schematic diagram of a structure of an illustrated media processing device, the media processing device is a wireless local area network (WLAN) router 1. The router 1 may be connected to an operator network or another local network 2 using an interface, such as Ethernet/an optical fiber/various types of digital subscriber lines/the Third Generation Mobile Communication/the Long Term Evolution. The router 1 communicates with a media source device 3 using an interface 4 corresponding to the first communications protocol. The media source device 3 may be a terminal device such as a mobile phone or a tablet computer. The first communications protocol includes any one of the BLUETOOTH protocol, the UPnP protocol, the DLNA protocol, the IGRS protocol, the AIRPLAY protocol, and the Wi-Fi display protocol.

Before determining to virtually construct a media receiving client for which first communications protocol, the media processing device may acquire, by means of a WLAN, Wi-Fi Direct, or BLUETOOTH, a type of a protocol supported by the media source device. Furthermore, the media processing device may determine, by listening to a multicast packet sent by a media source device or by sending a search request and receiving a response, that a media source device of which first communications protocol exists in order to determine the first communications protocol.

Step S202: The media processing device finds at least one media playback device by connection to a communications interface of the at least one media playback device, and acquires a media processing capability and a supported second communications protocol of the at least one media playback device.

The media processing device is connected to the media playback device using an interface of the second communications protocol, finds the media playback device by listening to a message and the like that are sent through the interface, and acquires the media processing capability and the supported second communications protocol of the media playback device. As shown in FIG. 3, the media processing device is connected to a media playback device 5 using a local area network (LAN) interface 6. The second communications protocol includes any one of the HDMI protocol, the DISPLAYPORT protocol, the DIIVA protocol, the HDBASET protocol, the MHL protocol, the THUNDERBOLT protocol, the WIGIG protocol, the WHDI protocol, and the WIRELESSHD protocol.

The media processing capability may be any one or more of a supported media format (for example, H.264, H.265, MP3, and JPEG), a supported media type (for example, video, audio, audio and video, and an image), a supported video resolution (for example, 720p, 1080p, 4K, and 8K), a supported pixel depth (for example, 30 bits per pixel, 36 bits per pixel, and 48 bits per pixel), a supported video frame rate (for example, 24 Hz, 50 Hz, and 60 Hz), whether 3D is supported, a supported audio sampling rate (for example, 32 kHz, 44.1 kHz, and 48 kHz), and the like.

Information about the interface may further include whether a transmission control protocol (TCP)/Internet Protocol (IP) protocol stack is supported/enabled. The information may be acquired according to a manner defined by various types of second communications protocols. For example, for the HDMI and the like, whether the media processing device supports the Ethernet may be detected using a capability discovery control (CDC) message, or determining is performed by detecting a packet received by a port.

The information about the interface may further include whether an IP receive end is supported/enabled. If a device that is connected to a port on a LAN side supports the TCP/IP protocol stack, whether a receive end of one or more protocols such as the UPnP/DLNA, the AIRPLAY, and the IGRS is supported may be further determined.

For the UPnP/DLNA, whether a port sends a Simple Service Discovery Protocol (SSDP) announcement message and whether an SSDP announcement is only that a device type is "MediaRenderer" (DMR) may be listened to.

For the IGRS protocol, a detection manner is similar to an SSDP packet.

For the AIRPLAY, a multicast domain name system (mDNS) packet and an AIRPLAY (a wireless communications technology developed by Apple Inc.) field therein may be listened to.

With respect to a UPnP/DLNA device, a media format supported by the playback client may be further determined. Furthermore, a TCP connection is established with the device, and "GetProtocolInfo( ) action" is invoked to obtain a list of media formats supported by the device.

According to whether the media playback device supports and runs the receive end of the one or more protocols such as the UPnP/DLNA, the AIRPLAY, and the IGRS, if yes, it may be not necessary to construct, with respect to the media playback device, a media receiving client that is supported and run. Alternatively, according to a media processing capability of the media processing device itself, a media receiving client is still correspondingly constructed with respect to a media receiving client that is supported and run by the media playback device, and the constructed media receiving client includes a media capability that is not supported by the media receiving client on the media playback device but is supported by the media processing device. For example, if the media playback device supports a DLNA DMR client, the DLNA DMR client supports a format such as H.264, MP3, advance audio coding (AAC), and WINDOWS media video (wmv), and the media playback device itself further supports a format such as Matroska Video (mkv), VP8, and H.265, a DMR obtained by means of virtualization announces, to a network, that the format such as mkv, vp8, and H.265 is supported.

Step S203: The media processing device constructs, with respect to each of the first communications protocol, a media receiving client that has a media processing capability of each media playback device.

One or more clients are obtained by means of virtualization for each device on the LAN side. If a device on the LAN side supports only high-definition audio or high-definition video, a Wi-Fi/BLUETOOTH client obtained by means of virtualization supports only an audio or video playback capability correspondingly. If a device on the LAN side supports playback of audio and video, a Wi-Fi/BLUETOOTH client obtained by means of virtualization supports audio and video.

For the UPnP/DLNA protocol and the IGRS protocol, a DMR is obtained by means of virtualization, and an SSDP multicast announcement is sent to a LAN. The DMR obtained by means of virtualization inherits a media format supported by a WLAN router itself a control plane (CP) on the network may acquire, using GetProtocolInfo( ) a list of media formats supported by the DMR. Alternatively, in addition to announcement of a device by means of IP multicast on a WLAN, virtual device information may be sent to a mobile device that has not accessed the WLAN. For example, when a Wi-Fi query message (peer-to-peer (P2P) Probe Request/Service Discovery Request) sent by a mobile terminal is received, a response (P2P Probe Response/Service Discovery Response) that carries a field of virtual device information (for example, "DLNA", universally unique identifier (UUID), and a supported media format) is returned.

For the AIRPLAY protocol, a player client is obtained by means of virtualization, a multicast announcement is sent using an mDNS, and at least a media type such as AAC, H.264, and JPEG is supported.

For the Wi-Fi display protocol, a Wi-Fi display receive end (sink) is obtained by means of virtualization, device information is announced by means of Wi-Fi protocol broadcast or is returned when a P2P query message sent by the mobile device is received, and at least a decoder such as linear pulse-code modulation (L-PCM) and H.264 is supported.

For the BLUETOOTH protocol, an audio or audio/video (A/V) receiving client is obtained by means of virtualization, and existence of the device is broadcast and announced using a BLUETOOTH mechanism.

Step S204: The media processing device sends information about the at least one media receiving client to a media source device using a network interface corresponding to the first communications protocol.

After constructing the media receiving client, the media processing device broadcasts existence of the media receiving client using a first communications protocol corresponding to the media receiving client. The media source device may receive, by means of listening, information about the media receiving client corresponding to the first communications protocol that is supported by the media source device. On the contrary, a media source device that does not support the first communications protocol does not receive or does not understand the information about the media receiving client.

For example, whether the mobile terminal finds the media receiving client on the network depends on a type of a protocol supported and enabled by the mobile terminal. For example, if the mobile terminal supports only the DLNA, the mobile terminal cannot find another client.

There may be two implementation manners for finding, by means of Wi-Fi, a media receiving client that supports the DLNA, the AIRPLAY, the IGRS, and the like.

When the mobile terminal accesses the WLAN, the mobile terminal learns, by listening to the SSDP packet and the mDNS packet, that there is a sink device. The mobile terminal, by means of IP-based multicast/broadcast discovery, not only finds a virtual client on the router, but may also find a client on another device that is connected to the LAN.

When the mobile terminal does not access the WLAN but enables Wi-Fi Direct scanning, the mobile terminal may learn, using Wi-Fi Direct discovery protocol interaction, that the foregoing client runs on the router. The mobile terminal establishes a Wi-Fi Direct connection with the router, separately acquires an IP address, and then establishes a TCP connection with the sink to acquire more detailed information (such as a supported media type and a list of media formats) about the Sink end.

Finding an A/V sink using the BLUETOOTH is as follows. A BLUETOOTH device on the router may be found by scanning, pairing is performed (automatically or after determining is performed by a user), and a BLUETOOTH connection is established directly if the pairing has already been performed before.

Step S205: The media processing device receives to-be-played media data that is sent by the media source device and that is to be played by a media receiving client specified by the media source device.

After step S204, a list of media receiving clients of the one or more protocols is acquired on the media source device, and may be presented to the user using a user interface (UI), and selection of one or more media receiving clients by the user is received to perform playback.

With respect to playback of media content that is locally stored or that is on the network, a specific processing manner may be any one of the following.

The user first selects to-be-played media on a browser or a music/video playback application of the mobile terminal, where the media may be locally stored on the media source device or be linked to the network. A prompt on the UI indicates that the user may perform playback on another device on the local area network. After clicking is performed by the user, the list of media receiving clients (names and/or icons) is displayed. The user clicks a media receiving client or multiple media receiving clients in the list to complete the selection. In this manner, a processing manner for displaying the list of the media receiving client may be as follows: the list of media receiving clients that has already been found is displayed and the client is displayed according to each protocol, and in this case, if the user clicks an icon of which playback device, the media receiving client device is determined, and an interaction protocol is also determined, or the list of media receiving clients that has already been found is displayed and only a client found using a type of a protocol is displayed.

The media processing device receives the to-be-played media data and specified information of the media receiving client.

Step S206: The media processing device unpacks and/or decodes the received to-be-played media data according to a first communications protocol corresponding to the specified media receiving client.

Step S207: The media processing device encodes and/or packs, according to a second communications protocol corresponding to the specified media receiving client, the to-be-played media data that is unpacked and/or decoded.

The playback client obtained by means of virtualization on the router is responsible for accepting control of the mobile terminal and receiving a media stream. The router processes the received media stream and sends a processed media stream to an actual media playback device that is corresponding to the media receiving client and that is connected to the LAN side. Specific media processing is unpacking and decoding the acquired media stream, re-encoding and/or repacking the media stream according to different transmission manners (such as the HDMI, the HDBASET, and the WHDI) of a corresponding device on the LAN side, and sending processed media data to a corresponding media playback device.

Step S208: The media processing device sends, using the second communications protocol corresponding to the specified media receiving client, the to-be-played media data to a media playback device that is corresponding to the specified media receiving client, for the media playback device to play.

The media playback device on the LAN side processes the media data received from the router and presents the media data (audio, video, or audio and video), where the processing includes unpacking and packing, and/or decoding, and the like.

FIG. 3 is used as an example, and the foregoing steps are executed by a processor 7 in the WLAN router 1.

It can be seen that according to the media processing method provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 4:
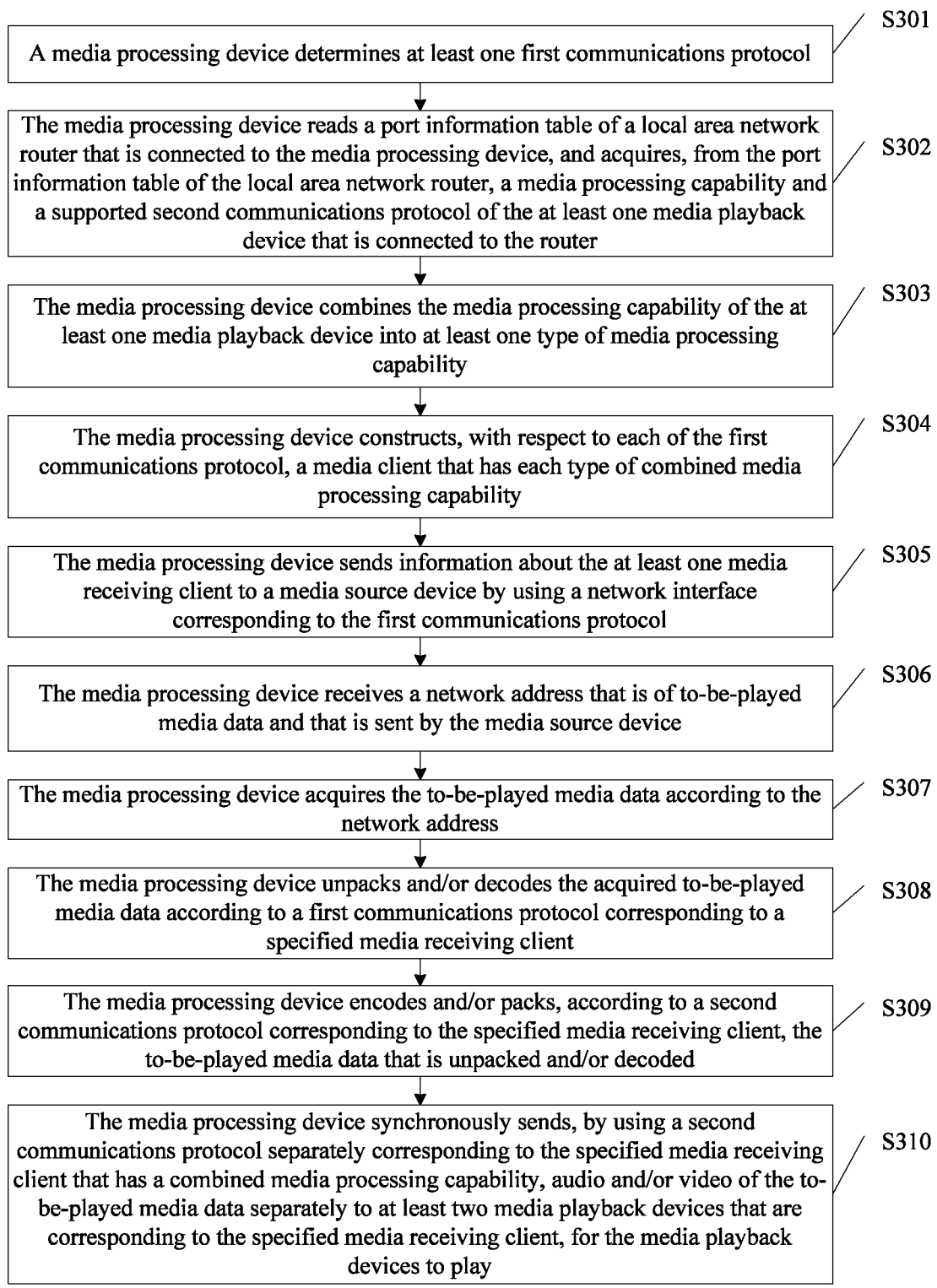
FIG. 4 is a schematic flowchart of still another media processing method according to an embodiment of the present disclosure.

Refer to FIG. 4, which is a schematic flowchart of still another media processing method according to an embodiment of the present disclosure. The method includes the following steps.

Step S301: A media processing device determines at least one first communications protocol.

This step is the same as step S201 in the foregoing embodiment, and details are not described herein again.

Step S302: The media processing device reads a port information table of a local area network router that is connected to the media processing device, and acquires, from the port information table of the local area network router, a media processing capability and a supported second communications protocol of the at least one media playback device that is connected to the router.

A difference between this embodiment and the foregoing embodiment lies in that the media processing device in this embodiment is not directly connected to the media playback device and cannot directly acquire a list of media playback devices that are connected to a LAN. A solution provided herein is that the media processing device acquires, using the LAN router, an information table of a device that is connected to each LAN interface of the local area network router. Further, a TCP/IP-based port information reading instruction may be designed. For example, the UPnP protocol "action" is defined for the acquiring, or the hypertext transfer protocol (HTTP), the dynamic host configuration protocol (DHCP), or another protocol may be used for acquiring. An interface information table of a device on a LAN side of the router includes a media processing capability and a supported second communications protocol of multiple media playback devices that are connected to the LAN router.

Step S303: The media processing device combines the media processing capability of the at least one media playback device into at least one type of media processing capability.

Step S304: The media processing device constructs, with respect to each of the first communications protocol, a media client that has each type of combined media processing capability.

For example, at least two devices on the LAN side are combined to obtain, by means of virtualization, one media receiving client, and the devices on the LAN side may be specified as peripherals that have a single function, for example, one is a display that supports only video output, and the other is a speaker that supports only audio output. A WLAN router may separately obtain, by means of virtualization, a combined client for the foregoing one or more Wi-Fi/BLUETOOTH protocols accordingly. This client is announced outside as an A/V playback device. The at least two devices on the LAN side herein are connected to the router using, but not limited to, a connection manner, and may also be connected using different cables/a wireless manner. For example, one is connected using the HDMI, and the other is connected using the HDBASET. For another example, one is connected using the HDBASET, and the other is connected using the WHDI.

A media receiving client is independently obtained by means of virtualization for some devices on the LAN side, and a manner of combination and virtualization is used to process another device on the LAN side. For example, for a device that is on the LAN side and that supports A/V, independent virtualization is performed, and for a device that is on the LAN side and that supports only audio/video, combination and virtualization are performed with another device that supports only video/audio.

Step S305: The media processing device sends information about the at least one media receiving client to a media source device using a network interface corresponding to the first communications protocol.

A list of media receiving clients that has already been found is displayed, and consolidation and display are performed according to a found physical device. For example, multiple clients on a same physical device are consolidated according to an IP address, and/or a media access control (MAC) address, and/or a BLUETOOTH device address, and displayed as one playback device (a name and/or an icon).

Step S306: The media processing device receives a network address that is of to-be-played media data and that is sent by the media source device.

Step S307: The media processing device acquires the to-be-played media data according to the network address.

If the to-be-played media data is not locally stored on the media source device, but is stored on a network, the media source device may return the network address of the to-be-played media data, and then the media processing device acquires the to-be-played media data from the network according to the network address. An acquiring technology thereof is the same as that in the prior art, and details are not described herein again.

Step S308: The media processing device unpacks and/or decodes the acquired to-be-played media data according to a first communications protocol corresponding to a specified media receiving client.

Step S309: The media processing device encodes and/or packs, according to a second communications protocol corresponding to the specified media receiving client, the to-be-played media data that is unpacked and/or decoded.

Step S308 and step S309 are the same as step S206 and step S207 in the foregoing embodiment, respectively, and details are not described herein again.

Step S310: The media processing device synchronously sends, using a second communications protocol separately corresponding to the specified media receiving client that has a combined media processing capability, audio and/or video of the to-be-played media data separately to at least two media playback devices that are corresponding to the specified media receiving client, for the media playback devices to play.

With respect to when one virtual client is corresponding to multiple devices (for example, audio and video are separately output to two devices, multichannel audio is output to multiple speakers separately, or multiple devices simultaneously play same media), and when a media stream is sent to multiple high-definition devices, synchronization also needs to be controlled, that is, synchronization clock information is sent to the multiple devices, and/or synchronization of sending multiple channels of data is precisely controlled.

It can be seen that according to the media processing method provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 5:
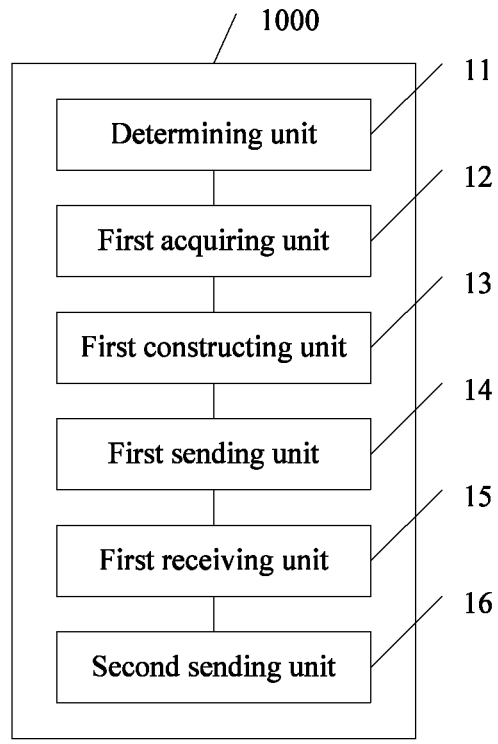
FIG. 5 is a schematic diagram of a structure of a media processing device according to an embodiment of the present disclosure.

Refer to FIG. 5, which is a schematic diagram of a structure of a media processing device according to an embodiment of the present disclosure. The media processing device 1000 includes the following units.

The determining unit 11 is configured to determine at least one first communications protocol.

The first acquiring unit 12 is configured to acquire a media processing capability and a supported second communications protocol of at least one media playback device.

In this embodiment of the present disclosure, the media processing device communicates with a media source device, and sends, to a media playback device, to-be-played media data that is acquired from the media source device or that is acquired using the media source device. The determining unit 11 determines one or more first communications protocols, where the first communications protocol is a communications protocol used between the media processing device 1000 and the media source device. The media processing device 1000 communicates with one or more media playback devices. The first acquiring unit 12 acquires a media processing capability and a supported second communications protocol of the one or more media playback devices, where a communications protocol used between the media processing device 1000 and the one or more media playback devices is the second communications protocol. The media processing capability is a playback capability of the media playback device, which may be any one or more of a supported media format (for example, H.264, H.265, mp3, and JPEG), a supported media type (for example, video, audio, audio and video, and an image), a supported video resolution (for example, 720p, 1080p, 4K, and 8K), a supported pixel depth (for example, 30 bits per pixel, 36 bits per pixel, and 48 bits per pixel), a supported video frame rate (for example, 24 Hz, 50 Hz, and 60 Hz), whether 3D is supported, a supported audio sampling rate (for example, 32 kHz, 44.1 kHz, and 48 kHz), and the like.

The first communications protocol includes any one of the BLUETOOTH protocol, the UPnP protocol, the DLNA protocol, the IGRS protocol, the AIRPLAY protocol, and the Wi-Fi display protocol.

The media playback device may be a computer, a television set, a player, or the like. The second communications protocol includes any one of the HDMI protocol, the DISPLAYPORT protocol, the DIIVA protocol, the HDBASET protocol, the MHL protocol, the THUNDERBOLT protocol, the WIGIG protocol, the WHDI protocol, and the WIRELESSHD protocol.

The first constructing unit 13 is configured to construct, for each of the first communications protocol, at least one media receiving client that has the media processing capability of the at least one media playback device.

The first sending unit 14 is configured to send information about the at least one media receiving client to the media source device using a network interface corresponding to the first communications protocol.

The first constructing unit 13 constructs one or more media receiving clients with respect to each of the first communications protocol, where the media receiving client has the media processing capability of the foregoing one or more media playback devices. The first sending unit 14 sends, to the media source device using a network interface corresponding to each of the first communications protocol, information about a constructed media receiving client corresponding to the first communications protocol, where the information about the media receiving client includes a name and/or an icon, a media processing capability, and the like of the media receiving client.

The media source device may be a terminal device such as a mobile phone or a tablet computer.

The first receiving unit 15 is configured to receive to-be-played media data that is sent by the media source device and that is to be played by a media receiving client specified by the media source device.

After the media source device acquires the information about the media receiving client, the name and/or the icon of the media receiving client is displayed on the media source device. Matching the to-be-played media data with the media processing capability of the media receiving client may be performed in order to determine a media receiving client that plays the to-be-played media data. Certainly, playback herein is not playback actually performed by the media receiving client, but playback performed by a media playback device that has an actual media processing capability and that is corresponding to the media receiving client, or may be operated by a user on the media source device to specify a media receiving client. The to-be-played media data may be media data that can be directly played, or an address of media data that can be played may be acquired. The media source device sends the to-be-played media data and specified information of the media receiving client to the media processing device 1000.

The first receiving unit 15 receives the to-be-played media data and the specified information of the media receiving client.

The second sending unit 16 is configured to send, using a second communications protocol corresponding to the specified media receiving client, the to-be-played media data to a media playback device that is corresponding to the specified media receiving client, for the media playback device to play.

Because the constructed media receiving client is corresponding to one or more media playback devices, and each media playback device communicates with the media processing device using the second communications protocol, where the second communications protocol may be one communications protocol or multiple communications protocols, the second sending unit 16 sends, using the second communications protocol, the received to-be-played media data to the media playback device that is corresponding to the specified media receiving client, for the media playback device to play.

In this embodiment, multiple media playback devices are connected to a media processing device 1000. A media source device may be corresponding to multiple media receiving clients. Each media receiving client has a corresponding media processing capability. The media source device only needs to specify a media receiving client for playback according to matching between to-be-played media data and a media processing capability of a media receiving client or according to an operation instruction of a user, and after receiving the to-be-played media data, the media processing device may send the to-be-played media data to a media playback device corresponding to the specified media receiving client. Because the media source device is corresponding to a virtually constructed media receiving client, the media receiving client may be switched as desired such that the media playback device that actually performs playback is switched.

It can be seen that according to the media processing device provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 6:
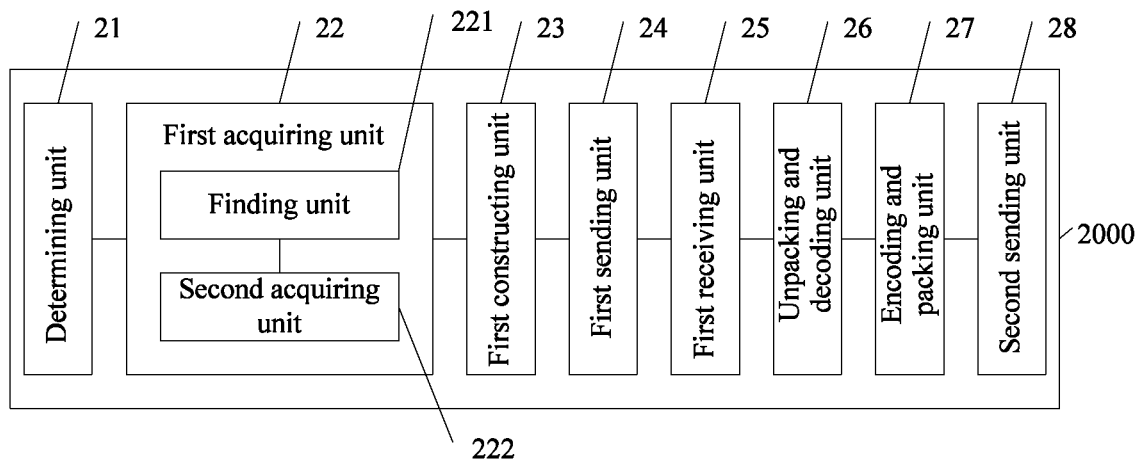
FIG. 6 is a schematic diagram of a structure of another media processing device according to an embodiment of the present disclosure.

Refer to FIG. 6, which is a schematic diagram of a structure of another media processing device according to an embodiment of the present disclosure. The media processing device 2000 includes the following units.

The determining unit 21 is configured to determine at least one first communications protocol.

The determining unit 21 in this embodiment is the same as the determining unit 11 in the foregoing embodiment. In this embodiment, the media processing device 2000 may be a LAN router. As shown in FIG. 3, which is a schematic diagram of a structure of an example of a media processing device, the media processing device is a WLAN router 1. The router 1 may be connected to an operator network or another local network 2 using an interface, such as Ethernet/an optical fiber/various types of digital subscriber lines/the Third Generation Mobile Communication/the Long Term Evolution. The router 1 communicates with a media source device 3 using an interface 4 corresponding to the first communications protocol. The media source device 3 may be a terminal device such as a mobile phone or a tablet computer. The first communications protocol includes any one of the BLUETOOTH protocol, the UPnP protocol, the DLNA protocol, the IGRS protocol, the AIRPLAY protocol, and the Wi-Fi display protocol.

Before the media processing device 2000 determines to virtually construct a media receiving client for which first communications protocol, the determining unit 21 may acquire, by means of a WLAN, Wi-Fi Direct, or BLU- ETOOTH, a type of a protocol supported by the media source device. Furthermore, the determining unit 21 may determine, by listening to a multicast packet sent by a media source device or by sending a search request and receiving a response, that a media source device of which first communications protocol exists in order to determine the first communications protocol.

The first acquiring unit 22 is configured to acquire a media processing capability and a supported second communications protocol of at least one media playback device.

In this embodiment, the first acquiring unit 22 includes a finding unit 221 and a second acquiring unit 222.

The finding unit 221 is configured to find the at least one media playback device by connection to a communications interface of the at least one media playback device.

The second acquiring unit 222 is configured to acquire the media processing capability and the supported second communications protocol of the at least one media playback device.

The media processing device 2000 is connected to the media playback device using an interface of the second communications protocol, the finding unit 221 finds the media playback device by listening to a message and the like that are sent through the interface, and the second acquiring unit 222 acquires the media processing capability and the supported second communications protocol of the media playback device. As shown in FIG. 3, the media processing device is connected to a media playback device 5 using a LAN interface 6. The second communications protocol includes any one of the HDMI protocol, the DISPLAYPORT protocol, the DIIVA protocol, the HDBASET protocol, the MHL protocol, the THUNDERBOLT protocol, the WIGIG protocol, the WHDI protocol, and the WIRELESSHD protocol.

The media processing capability may be any one or more of a supported media format (for example, H.264, H.265, mp3, and JPEG), a supported media type (for example, video, audio, audio and video, and an image), a supported video resolution (for example, 720p, 1080p, 4K, and 8K), a supported pixel depth (for example, 30 bits per pixel, 36 bits per pixel, and 48 bits per pixel), a supported video frame rate (for example, 24 Hz, 50 Hz, and 60 Hz), whether 3D is supported, a supported audio sampling rate (for example, 32 kHz, 44.1 kHz, and 48 kHz), and the like.

Information about the interface may further include whether a TCP/IP protocol stack is supported/enabled. The information may be acquired according to a manner defined by various types of second communications protocols. For example, for the HDMI and the like, whether the media processing device supports the Ethernet may be detected using a CDC message, or determining is performed by detecting a packet received by a port.

The information about the interface may further include whether an IP receive end is supported/enabled. If a device that is connected to a port on a LAN side supports the TCP/IP protocol stack, whether a receive end of one or more protocols such as the UPnP/DLNA, the AIRPLAY, and the IGRS is supported may be further determined.

For the UPnP/DLNA, whether a port sends a SSDP announcement message and whether an SSDP announcement is only that a device type is DMR may be listened to.

For the IGRS protocol, a detection manner is similar to an SSDP packet.

For the AIRPLAY, a mDNS packet and an AIRPLAY (a wireless communications technology developed by Apple Inc.) field therein may be listened to.

With respect to a UPnP/DLNA device, a media format supported by the playback client may be further determined. A TCP connection is established with the device, and "GetProtocolInfo( ) action" is invoked to obtain a list of media formats supported by the device.

According to whether the media playback device supports and runs the receive end of the one or more protocols such as the UPnP/DLNA, the AIRPLAY, and the IGRS, if yes, it may be not necessary to construct, with respect to the media playback device, a media receiving client that is supported and run. Alternatively, according to a media processing capability of the media processing device itself, a media receiving client is still correspondingly constructed with respect to a media receiving client that is supported and run by the media playback device, and the constructed media receiving client includes a media capability that is not supported by the media receiving client on the media playback device but is supported by the media processing device. For example, if the media playback device supports a DLNA DMR client, the DLNA DMR client supports a format such as H.264, MP3, AAC, and wmv, and the media playback device itself further supports a format such as mkv, vp8, and H.265, a DMR obtained by means of virtualization announces, to a network, that the format such as mkv, vp8, and H.265 is supported. For this case, the first constructing unit may include a determining unit configured to determine a media receiving client corresponding to the at least one first communications protocol supported by the at least one media playback device, a third constructing unit configured to construct, with respect to each of the first communications protocol that is not supported by the at least one media playback device, at least one media receiving client that has the media processing capability of the at least one media playback device, and/or a fourth constructing unit configured to construct, with respect to each of the first communications protocol that is supported by the at least one media playback device, at least one media receiving client that has a media processing capability that is not supported by the media playback device but is supported by the media processing device.

The first constructing unit 23 is configured to construct, with respect to each of the first communications protocol, a media receiving client that has a media processing capability of each media playback device.

The first constructing unit 23 obtains, by means of virtualization, one or more clients for each device on the LAN side. If a device on the LAN side supports only high-definition audio or high-definition video, a Wi-Fi/BLUETOOTH client obtained by means of virtualization supports only an audio or video playback capability correspondingly. If a device on the LAN side supports playback of audio and video, a Wi-Fi/BLUETOOTH client obtained by means of virtualization supports audio and video.

The first sending unit 24 is configured to send information about the at least one media receiving client to the media source device using a network interface corresponding to the first communications protocol.

After the first constructing unit 23 constructs the media receiving client, the first sending unit 24 broadcasts existence of the media receiving client using a first communications protocol corresponding to the media receiving client. The media source device may receive, by means of listening, information about the media receiving client corresponding to the first communications protocol that is supported by the media source device. On the contrary, a media source device that does not support the first communications protocol does not receive or does not understand the information about the media receiving client.

The first receiving unit 25 is configured to receive to-be-played media data that is sent by the media source device and that is to be played by a media receiving client specified by the media source device.

The first receiving unit 25 receives the to-be-played media data and specified information of the media receiving client.

The unpacking and decoding unit 26 is configured to unpack and/or decode the received to-be-played media data according to a first communications protocol corresponding to the specified media receiving client.

The encoding and packing unit 27 is configured to encode and/or pack, according to a second communications protocol corresponding to the specified media receiving client, the to-be-played media data that is unpacked and/or decoded.

The playback client obtained by means of virtualization on the router is responsible for accepting control of a mobile terminal and receiving a media stream. The router processes the received media stream and sends a processed media stream to an actual media playback device that is corresponding to the media receiving client and that is connected to the LAN side. Specific media processing is as follows: the unpacking and decoding unit 26 unpacks and decodes the acquired media stream, the encoding and packing unit 27 re-encodes and/or repacks the media stream according to different transmission manners (such as the HDMI, the HDBASET, and the WHDI) of a corresponding device on the LAN side, and processed media data is sent to a corresponding media playback device.

The second sending unit 28 is configured to send, using the second communications protocol corresponding to the specified media receiving client, the to-be-played media data to a media playback device that is corresponding to the specified media receiving client, for the media playback device to play.

The media playback device on the LAN side processes the media data received from the router and presents the media data (audio, video, or audio and video), where the processing includes unpacking and packing, and/or decoding, and the like.

It can be seen that according to the media processing device provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 7:
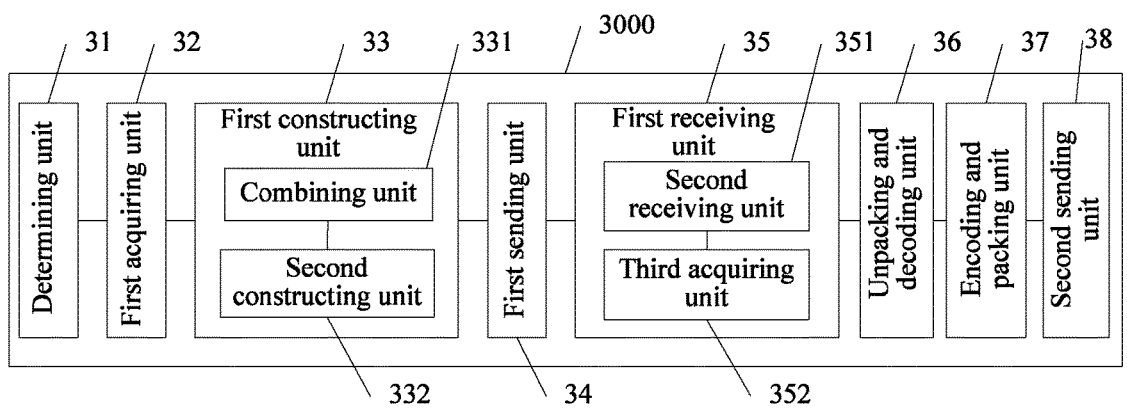
FIG. 7 is a schematic diagram of a structure of another media processing device according to an embodiment of the present disclosure.

Refer to FIG. 7, which is a schematic diagram of a structure of another media processing device according to an embodiment of the present disclosure. The media processing device 3000 includes the following units.

The determining unit 31 is configured to determine at least one first communications protocol.

The determining unit 31 in this embodiment is the same as the determining unit 11 or the determining unit 21 in the foregoing embodiments, and details are not described herein again.

The first acquiring unit 32 is configured to read a port information table of a LAN router that is connected to the media processing device 3000, and acquire, from the port information table of the LAN router, a media processing capability and a supported second communications protocol of at least one media playback device connected to the router.

A difference between this embodiment and the foregoing embodiment lies in that the media processing device 3000 in this embodiment is not directly connected to the media playback device, and the first acquiring unit 32 cannot directly acquire a list of media playback devices that are connected to a LAN. A solution provided herein is that the first acquiring unit 32 acquires, using the local area network router, an information table of a device that is connected to each LAN interface of the LAN router. Further, a TCP/IP-based port information reading instruction may be designed. For example, the UPnP protocol "action" is defined for the acquiring, or the HTTP, the DHCP, or another protocol may be used for the acquiring. An interface information table of a device on a LAN side of the router includes a media processing capability and a supported second communications protocol of multiple media playback devices that are connected to the LAN router.

The first constructing unit 33 is configured to construct, for each of the first communications protocol, at least one media receiving client that has the media processing capability of the at least one media playback device.

In this embodiment, the first constructing unit 33 includes a combining unit 331 and a second constructing unit 332.

The combining unit 331 is configured to combine the media processing capability of the at least one media playback device into at least one type of media processing capability.

The second constructing unit 332 is configured to construct, with respect to each of the first communications protocol, a media client that has each type of combined media processing capability.

For example, at least two devices on the LAN side are combined to obtain, by means of virtualization, one media receiving client, and the devices on the LAN side may be specified as peripherals that have a single function, for example, one is a display that supports only video output, and the other is a speaker that supports only audio output. A WLAN router may separately obtain, by means of virtualization, a combined client for the foregoing one or more Wi-Fi/BLUETOOTH protocols accordingly. This client is announced outside as an A/V playback device. The at least two devices on the LAN side herein are connected to the router using, but not limited to, a connection manner, and may also be connected using different cables/a wireless manner. For example, one is connected using the HDMI protocol, and the other is connected using the HDBASET protocol. For another example, one is connected using the HDBASET protocol, and the other is connected using the WHDI protocol.

A media receiving client is independently obtained by means of virtualization for some devices on the LAN side, and a manner of combination and virtualization is used to process another device on the LAN side. For example, for a device that is on the LAN side and that supports A/V, independent virtualization is performed, and for a device that is on the LAN side and that supports only audio/video, combination and virtualization are performed with another device that supports only video/audio.

The first sending unit 34 is configured to send information about the at least one media receiving client to a media source device using a network interface corresponding to the first communications protocol.

A list of media receiving clients that has already been found is displayed, and consolidation and display are performed according to a found physical device. For example, multiple clients on a same physical device are consolidated according to an IP address, and/or a MAC address, and/or a BLUETOOTH device address, and displayed as one playback device (a name and/or an icon).

The first receiving unit 35 is configured to receive to-be-played media data that is sent by the media source device and that is to be played by a media receiving client specified by the media source device.

In this embodiment, the first receiving unit 35 includes a second receiving unit 351 and a third acquiring unit 352.

The second receiving unit 351 is configured to receive a network address that is of the to-be-played media data and that is sent by the media source device.

The third acquiring unit 352 is configured to acquire the to-be-played media data according to the network address.

If the to-be-played media data is not locally stored on the media source device, but is stored on a network, the media source device may return the network address of the to-be-played media data, and then the media processing device acquires the to-be-played media data from the network according to the network address. An acquiring technology thereof is the same as that in the prior art, and details are not described herein again.

The unpacking and decoding unit 36 is configured to unpack and/or decode the acquired to-be-played media data according to a first communications protocol corresponding to the specified media receiving client.

The encoding and packing unit 37 is configured to encode and/or pack, according to a second communications protocol corresponding to the specified media receiving client, the to-be-played media data that is unpacked and/or decoded.

The unpacking and decoding unit 36 and the encoding and packing unit 37 in this embodiment are the same as the unpacking and decoding unit 26 and the encoding and packing unit 27 in the foregoing embodiment, respectively, and details are not described herein again.

The second sending unit 38 is configured to synchronously send, using a second communications protocol separately corresponding to the specified media receiving client that has a combined media processing capability, audio and/or video of the to-be-played media data separately to at least two media playback devices that are corresponding to the specified media receiving client, for the media playback devices to play.

With respect to when one virtual client is corresponding to multiple devices (for example, audio and video are separately output to two devices, multichannel audio is output to multiple speakers separately, or multiple devices simultaneously play same media), and when the second sending unit 38 sends a media stream to multiple high-definition devices, synchronization also needs to be controlled, that is, synchronization clock information is sent to the multiple devices, and/or synchronization of sending multiple channels of data is precisely controlled.

It can be seen that according to the media processing device provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 8A:
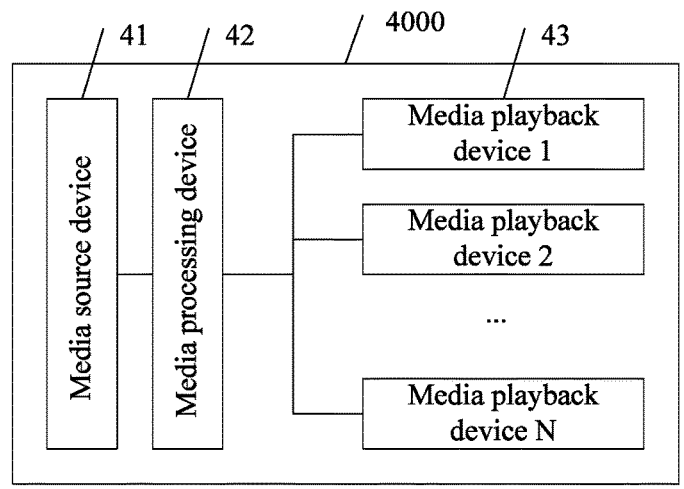
FIG. 8A is a schematic diagram of a structure of a media processing system according to an embodiment of the present disclosure.

Refer to FIG. 8A, which is a schematic diagram of a structure of a media processing system according to an embodiment of the present disclosure. The media processing system 4000 includes a media source device 41, a media processing device 42, and at least one media playback device 43.

The media source device 41 is connected to the media processing device 42, and the media processing device 42 is directly connected to the at least one media playback device 43.

The media processing device 42 may be the media processing device 1000 and the media processing device 2000 in the foregoing embodiments.

Figure 8B:
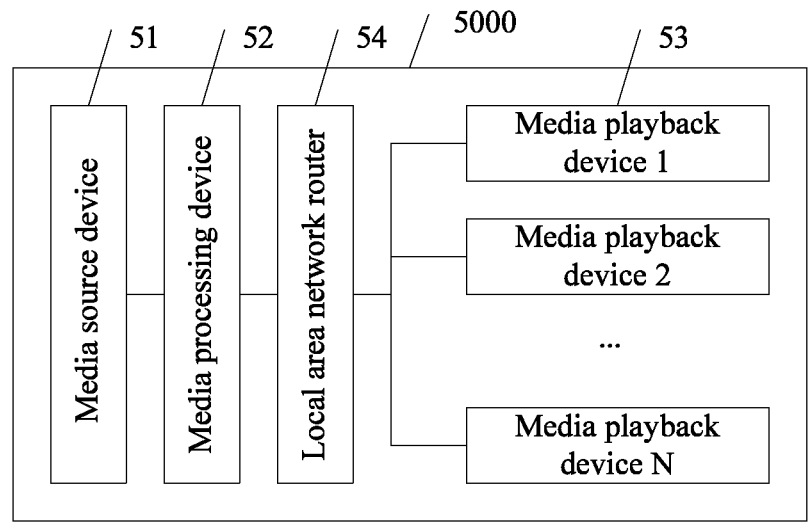
FIG. 8B is a schematic diagram of a structure of another media processing system according to an embodiment of the present disclosure.

Refer to FIG. 8B, which is a schematic diagram of a structure of another media processing system according to an embodiment of the present disclosure. The media processing system 5000 includes a media source device 51, a media processing device 52, at least one media playback device 53, and a LAN router 54.

The media source device 51 is connected to the media processing device 52, and the media processing device 52 is connected to the at least one media playback device 53 using the LAN router 54.

The media processing device 52 may be the media processing device 3000 in the foregoing embodiment.

It can be seen that according to the media processing system provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

Figure 9:
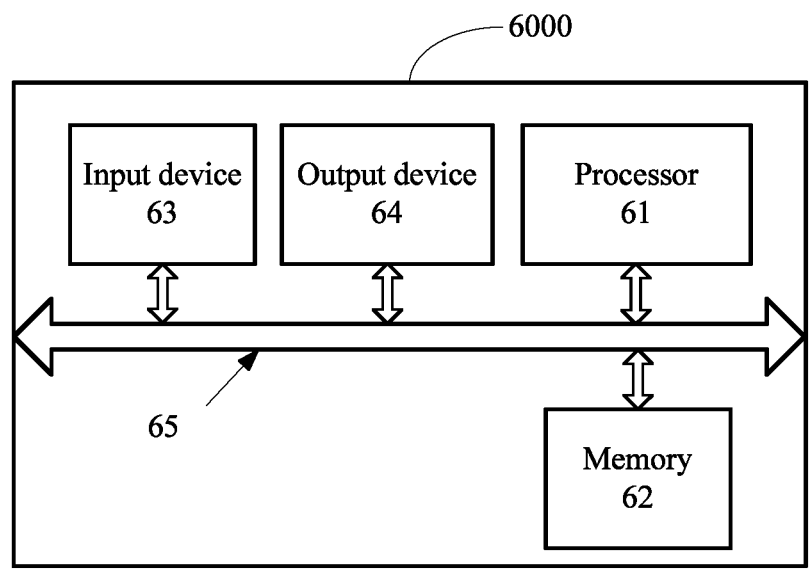
FIG. 9 is a schematic diagram of a structure of a media processing device according to an embodiment of the present disclosure.

Refer to FIG. 9, which is a schematic diagram of a structure of a media processing device according to an embodiment of the present disclosure. A media processing device 6000 in this embodiment includes a processor 61, a memory 62, an input device 63, an output device 64, and a bus system 65.

The processor 61 controls an operation of the media processing device 6000. The processor 61 may also be called a central processing unit (CPU). The processor 61 may be an integrated circuit chip and has a signal processing capability. The processor 61 may be a general purpose processor, a digital signal processor (DSP), an application-specific integrated circuit (ASIC), a field programmable gate array (FPGA), or another programmable logical device, a discrete gate or a transistor logical device, or a discrete hardware component. The general purpose processor may be a microprocessor or the processor may be any conventional processor and the like.

The memory 62 may include a read-only memory and a random access memory, and provides an instruction and data to the processor 61. A part of the memory 62 may further include a non-volatile random access memory (NVRAM).

Components of the media processing device 6000 are coupled together using the bus system 65. The bus may be an Industry Standard Architecture (ISA) bus, a Peripheral Component Interconnect (PCI) bus, an Extended Industry Standard Architecture (EISA) bus, or the like. The bus may be one or more physical lines. When the bus is multiple physical lines, the bus may be divided into an address bus, a data bus, a control bus, and the like. In some other embodiments of the present disclosure, the processor 61, the memory 62, the input device 63, and the output device 64 may be connected directly using a communications line.

The input device 63 may be further implemented as a mouse, a keyboard, a microphone, and the like. The output device 64 may be further implemented as a display, an audio device, and a video device. Certainly, the input device 63 and the output device 64 may also implement functions thereof using one input and output device, for example, implemented as a touchscreen.

The processor 61 reads a computer program in the memory 62 to execute the following steps: determining, by the media processing device, at least one first communications protocol, and acquiring a media processing capability and a supported second communications protocol of at least one media playback device, constructing, by the media processing device for each of the first communications protocol, at least one media receiving client that has the media processing capability of the at least one media playback device, and sending information about the at least one media receiving client to a media source device using a network interface corresponding to the first communications protocol, receiving, by the media processing device, to-be-played media data that is sent by the media source device and that is to be played by a media receiving client specified by the media source device, and sending, by the media processing device using a second communications protocol corresponding to the specified media receiving client, the to-be-played media data to a media playback device that is corresponding to the specified media receiving client, for the media playback device to play.

As an implementation manner, the step, executed by the processor 61, of acquiring a media processing capability and a supported second communications protocol of at least one media playback device is further finding, by the media processing device, the at least one media playback device by connection to a communications interface of the at least one media playback device, and acquiring the media processing capability and the supported second communications protocol of the at least one media playback device.

As another implementation manner, the step, executed by the processor 61, of acquiring a media processing capability and a supported second communications protocol of at least one media playback device is further reading, by the media processing device, a port information table of a local area network router that is connected to the media processing device, and acquiring, from the port information table of the local area network router, the media processing capability and the supported second communications protocol of the at least one media playback device that is connected to the router.

As still another implementation manner, the step, executed by the processor 61, of constructing, by the media processing device for each of the first communications protocol, at least one media receiving client that has the media processing capability of the at least one media playback device is further constructing, by the media processing device with respect to each of the first communications protocol, a media receiving client that has a media processing capability of each media playback device.

As still another implementation manner, the step, executed by the processor 61, of constructing, by the media processing device for each of the first communications protocol, at least one media receiving client that has the media processing capability of the at least one media playback device includes combining, by the media processing device, the media processing capability of the at least one media playback device into at least one type of media processing capability, and constructing, by the media processing device with respect to each of the first communications protocol, a media client that has each type of combined media processing capability.

As still another implementation manner, the step, executed by the processor 61, of constructing, by the media processing device for each of the first communications protocol, at least one media receiving client that has the media processing capability of the at least one media playback device includes determining, by the media processing device, a media receiving client corresponding to the at least one first communications protocol supported by the at least one media playback device, constructing, by the media processing device with respect to each of the first communications protocol that is not supported by the at least one media playback device, at least one media receiving client that has the media processing capability of the at least one media playback device, and/or constructing, by the media processing device with respect to each of the first communications protocol that is supported by the at least one media playback device, at least one media receiving client that has a media processing capability that is not supported by the media playback device but is supported by the media processing device.

As still another implementation manner, the step, executed by the processor 61, of receiving, by the media processing device, to-be-played media data that is sent by the media source device and that is to be played by a media receiving client specified by the media source device includes receiving, by the media processing device, a network address that is of the to-be-played media data and that is sent by the media source device, and acquiring, by the media processing device, the to-be-played media data according to the network address.

As still another implementation manner, after executing the step of receiving, by the media processing device, to-be-played media data that is sent by the media source device and that is to be played by a media receiving client specified by the media source device, and before executing the step of sending, by the media processing device using a second communications protocol corresponding to the specified media receiving client, the to-be-played media data to a media playback device that is corresponding to the specified media receiving client, for the media playback device to play, the processor 61 further executes the following steps: unpacking and/or decoding, by the media processing device, the received to-be-played media data according to a first communications protocol corresponding to the specified media receiving client, and encoding and/or packing, by the media processing device according to the second communications protocol corresponding to the specified media receiving client, the to-be-played media data that is unpacked and/or decoded.

As still another implementation manner, the step, executed by the processor 61, of sending, by the media processing device using a second communications protocol corresponding to the specified media receiving client, the to-be-played media data to a media playback device that is corresponding to the specified media receiving client, for the media playback device to play is further synchronously sending, by the media processing device using a second communications protocol separately corresponding to the specified media receiving client that has a combined media processing capability, audio and/or video of the to-be-played media data separately to at least two media playback devices that are corresponding to the specified media receiving client, for the media playback devices to play.

In the foregoing embodiment and implementation manners, the first communications protocol includes any one of the BLUETOOTH protocol, the UPnP protocol, the DLNA protocol, the IGRS protocol, the AIRPLAY protocol, and the Wi-Fi display protocol, and the second communications protocol includes any one of the HDMI protocol, the DIS-PLAYPORT protocol, the DIIVA protocol, the HDBASET protocol, the MHL protocol, the THUNDERBOLT protocol, the WIGIG protocol, the WHDI protocol, and the WIRE-LESSHD protocol.

A computer program included in the processor 61 provided in this embodiment of the present disclosure may be further implemented as a determining unit, a first acquiring unit, a first constructing unit, a first sending unit, a first receiving unit, and a second sending unit. For functions implemented by the six units, reference may be made to a description in the foregoing embodiments, and details are not described herein again.

It can be seen that according to the media processing device provided in this embodiment of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

In conclusion, according to the media processing method, device, and system provided in the embodiments of the present disclosure, one or more media receiving clients that have a media processing capability of one or more media playback devices are separately constructed for multiple communications protocols, to-be-played media data that is sent by a media source device and that is to be played by a media receiving client specified by the media source device is received, and the to-be-played media data is sent to a media playback device that is corresponding to the specified media receiving client, for the media playback device to play. In this way, multiple media playback devices can be connected flexibly and simultaneously and a media playback device can be switched as desired during media playback.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that all the embodiments described in this specification belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a random access memory (RAM), a read-only memory (ROM), an electrically erasable programmable read-only memory (EEPROM), a compact disc read-only memory (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure include a compact disc (CD), a laser disc, an optical disc, a DVD, a floppy disk and a BLU-RAY DISC, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure should fall within the protection scope of the present disclosure.

What is claimed is:

1. A media data processing method, comprising:
   determining, by a media processing device, at least one first communications protocol;
   acquiring a media processing capability and a supported second communications protocol of at least one media playback device;
   constructing, by the media processing device for each of the at least one first communications protocol, at least one media receiving client that has the media processing capability of the at least one media playback device by:
      combining, by the media processing device, the media processing capability of the at least one media playback device into at least one type of media processing capability; and
      constructing, by the media processing device with respect to each of the at least one first communications protocol, a media client that has each type of combined media processing capability;

sending information about the at least one media receiving client to a media source device using a network interface corresponding to the first communications protocol;

receiving, by the media processing device, to-be-played media data that is sent by the media source device and that is to be played by the media receiving client specified by the media source device; and synchronously sending, by the media processing device using the second communications protocol separately corresponding to the specified media receiving client that has the combined media processing capability, at least one of audio or video of the to-be-played media data separately to at least two media playback devices that correspond to the specified media receiving client, for the media playback device to play.

2. The method according to claim 1, wherein acquiring the media processing capability and the supported second communications protocol of at least one media playback device comprises:

finding, by the media processing device, the at least one media playback device by connection to a communications interface of the at least one media playback device; and acquiring the media processing capability and the supported second communications protocol of the at least one media playback device.

3. The method according to claim 1, wherein acquiring the media processing capability and the supported second communications protocol of at least one media playback device comprises:

reading, by the media processing device, a port information table of a local area network router that is connected to the media processing device; and acquiring, from the port information table of the local area network router, the media processing capability and the supported second communications protocol of the at least one media playback device that is connected to the router.

4. The method according to claim 1, wherein receiving, by the media processing device, the to-be-played media data that is sent by the media source device and that is to be played by the media receiving client specified by the media source device comprises:

receiving, by the media processing device, a network address that is of the to-be-played media data and that is sent by the media source device; and acquiring, by the media processing device, the to-be-played media data according to the network address.

5. The method according to claim 1, wherein after receiving, by the media processing device, the to-be-played media data that is sent by the media source device and that is to be played by the media receiving client specified by the media source device, and wherein before sending, by the media processing device using the second communications protocol corresponding to the specified media receiving client, the to-be-played media data to the media playback device that corresponds to the specified media receiving client, for the media playback device to play, further comprises:

decoding, by the media processing device, the received to-be-played media data according to a first communications protocol corresponding to the specified media receiving client; and encoding, by the media processing device according to the second communications protocol corresponding to the specified media receiving client, the to-be-played media data that is decoded.

6. The method according to claim 1, wherein the first communications protocol comprises any one of a BLUETOOTH protocol, a universal plug and play protocol, a digital living network alliance (DLNA) protocol, an intelligent grouping and resource sharing (IGRS) protocol, an AIRPLAY protocol, and a Wi-Fi display protocol, and wherein the second communications protocol comprises any one of a high-definition multimedia interface (HDMI) protocol, a display port protocol, a digital interactive interface for video and audio (DIIVA) protocol, an HDBASET protocol, a mobile high-definition link (MHL) protocol, a THUNDERBOLT protocol, a wireless gigabit (WIGIG) protocol, a wireless home digital interface (WHDI) protocol, and a WIRELESSHD protocol.

7. A media data processing device, comprising:

a memory configured to store instructions; and a processor coupled to the memory and configured to execute the instructions to:

determine at least one first communications protocol;

acquire a media processing capability and a supported second communications protocol of at least one media playback device;

construct for each of the at least one first communications protocol, at least one media receiving client that has the media processing capability of the at least one media playback device by:

combining, by the media processing device, the media processing capability of the at least one media playback device into at least one type of media processing capability; and constructing, by the media processing device with respect to each of the at least one first communications protocol, a media client that has each type of combined media processing capability;

send information about the at least one media receiving client to a media source device using a network interface corresponding to the first communications protocol;

receive to-be-played media data that is sent by the media source device and that is to be played by the media receiving client specified by the media source device; and synchronously send using the second communications protocol separately corresponding to the specified media receiving client that has the combined media processing capability, at least one of audio or video of the to-be-played media data separately to at least two media playback devices that correspond to the specified media receiving client, for the media playback device to play.

8. The media processing device according to claim 7, wherein acquiring the media processing capability and the supported second communications protocol of the at least one media playback device comprises:

finding the at least one media playback device by connection to a communications interface of the at least one media playback device; and acquiring the media processing capability and the supported second communications protocol of the at least one media playback device.

9. The media processing device according to claim 7, wherein acquiring the media processing capability and the supported second communications protocol of the at least one media playback device comprises:

reading a port information table of a local area network router that is connected to the media processing device; and acquiring, from the port information table of the local area network router, the media processing capability and the supported second communications protocol of the at least one media playback device that is connected to the router.

10. The media processing device according to claim 7, wherein receiving to-be-played media data that is sent by the media source device and that is to be played by the media receiving client specified by the media source device comprises:

receiving a network address that is of the to-be-played media data and that is sent by the media source device; and acquiring the to-be-played media data according to the network address.

11. The media processing device according to claim 7, wherein the processor is further configured to execute the instructions to:

unpack the received to-be-played media data according to the first communications protocol corresponding to the specified media receiving client; and encode according to the second communications protocol corresponding to the specified media receiving client, the to-be-played media data that is decoded.

12. The media processing device according to claim 7, wherein the first communications protocol comprises any one of the BLUETOOTH protocol, a universal plug and play protocol, a digital living network alliance (DLNA) protocol, an intelligent grouping and resource sharing (IGRS) protocol, an AIRPLAY protocol, and a Wi-Fi display protocol, and wherein the second communications protocol comprises any one of a high-definition multimedia interface (HDMI) protocol, a display port protocol, a digital interactive interface for video and audio (DIIVA) protocol, an HDBASET protocol, a mobile high-definition link (MHL) protocol, a THUNDERBOLT protocol, a wireless gigabit (WIGIG) protocol, a wireless home digital interface (WHDI) protocol, and a WIRELESSHD protocol.

* * * * *

UNITED STATES PATENT AND TRADEMARK OFFICE
CERTIFICATE OF CORRECTION

PATENT NO.           : 9,826,281 B2
APPLICATION NO.      : 15/035836
DATED                : November 21, 2017
INVENTOR(S)          : Yu Zhu It is certified that error appears in the above-identified patent and that said Letters Patent is hereby corrected as shown below:

On the Title Page

On page 2 Column 2, Lines 12-14 under Other Publications should read:
"Home Networking Protocol 2.0," OpenCable Specifications, Home Networking 2.0, OC-SP-HNP2.0-I10-130530, May 30, 2013, 123 pages.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*